United States Patent
Wallace

Patent Number: 5,841,921
Date of Patent: Nov. 24, 1998

[54] OPTICAL COUPLING DEVICE

[76] Inventor: Troy B. Wallace, P.O. Box 438, Georgetown, Me. 04548

[21] Appl. No.: 792,663

[22] Filed: Jan. 31, 1997

[51] Int. Cl.⁶ .................... G02B 6/26; F21V 7/04
[52] U.S. Cl. .................... 385/46; 385/31; 385/39; 385/43; 385/45; 385/115; 385/147; 385/901; 362/32
[58] Field of Search .................... 385/31, 35, 38, 385/39, 42, 43, 44, 45, 46, 51, 95, 96, 98, 115, 116, 147, 901; 362/32

[56] References Cited

U.S. PATENT DOCUMENTS

| | | | |
|---|---|---|---|
| 2,939,362 | 6/1960 | Cole | 385/116 X |
| 3,389,950 | 6/1968 | Harper | 385/116 X |
| 3,411,011 | 11/1968 | Genahr | 385/115 X |
| 3,932,023 | 1/1976 | Humer | 385/35 X |
| 4,099,833 | 7/1978 | Tosswill | 385/116 X |
| 4,139,259 | 2/1979 | Kersten et al. | 385/46 X |
| 4,978,186 | 12/1990 | Mori | 385/901 X |
| 5,078,468 | 1/1992 | Stone | 385/116 |
| 5,117,473 | 5/1992 | Pan | 385/33 |
| 5,184,882 | 2/1993 | Davenport et al. | 362/32 |
| 5,293,438 | 3/1994 | Konno et al. | 385/35 |
| 5,313,542 | 5/1994 | Castonguay | 385/115 |
| 5,346,655 | 9/1994 | Blyler, Jr. et al. | 264/2.7 X |
| 5,408,551 | 4/1995 | Van Woesik | 385/28 |
| 5,438,485 | 8/1995 | Li et al. | 362/32 |
| 5,530,940 | 6/1996 | Ludwig, Jr. et al. | 385/31 |
| 5,559,911 | 9/1996 | Forkner et al. | 385/901 X |

*Primary Examiner*—Brian Healy
*Attorney, Agent, or Firm*—Terrance L. Siemens

[57] ABSTRACT

The present invention features a rectilinear optical coupler consisting of a single optical fiber terminating in an expanded, convex portion. An array of optical fibers consisting of a central optical fiber surrounded by six additional optical fibers has an end precision-ground to receive the convex, essentially spherical portion of the first optical fiber such that radiant energy in the single, input optical fiber is uniformly transferred to each of the fibers in the array. The convex/concave topology of the interface allows for uniform distribution of radiant energy in a small, rectilinear configuration which allows combining multiple couplers in an edge-to-edge arrangement.

10 Claims, 1 Drawing Sheet

OPTICAL COUPLING DEVICE

BACKGROUND OF THE INVENTION

1. Field of the Invention

The present invention relates to an optical fiber array and coupling device and, more particularly, to a fiber optic array comprising a single, central fiber surrounded radially by additional, symmetrically arranged, fiber optic strands. The fiber optic array is coupled to a single, input fiber so that radiant energy from the single, input fiber is uniformly coupled into each fiber of the array. The input fiber terminates in an expanded, convex geometry. The convex termination of the input fiber is matched to a concave geometry ground into the end of the array. The concave/convex geometry is nominally spherical.

2. Discussion of the Prior Art

Fiber optic arrays with couplers are well known in the art. Typically, a single, emissive, input optical fiber is coupled to a plurality of fibers in the array, each fiber in the array thereby also becoming illuminated. Each fiber in the array bundle then carries a portion of the energy from the input fiber. Such arrangements are useful for transmitting radiant energy from a light source to a plurality of destinations, e.g. from a signal lamp to multiple points on an automobile dashboard display. Such an arrangement is known in the art as a star coupler. The actual mechanism coupling the single input fiber to the plural output fibers is known as a mixing rod. In a typical configuration of the prior art, a straight-through or rectilinear configuration has generally been employed.

Because of the ease with which the distant ends (i.e., the ends away from the coupler) of a fiber optical array may be arranged, such arrays are useful for application such as automobile headlight systems. In a headlight system, a very specific "low" and "high" beam pattern of illumination is required. The demands of the automobile stylists impose difficult constraints on the lighting system. These problems may be overcome by, instead of using one or two focused headlamps, one or more light sources are located in a convenient place, not necessarily in the area usually reserved for traditional headlamp bulbs. A fiber optic array then carries energy from the lamp to the front of the vehicle body where, by arranging the output ends of the fibers, the desired illumination pattern is obtained. Not only may the pattern of the fibers by manipulated, but fibers of different sizes and/or geometries may be utilized. U.S. Pat. No. 5,184,882 for Projection Headlamp Lighting System Using Different Diameter Optical Light Conductors; issued John M. Davenport, et al. teaches such a system.

A coupling arrangement may also function as a mixer when the plural fibers are made emissive and then their energy is coupled into a single, output fiber. When optical-quality components are employed, the coupled light may be in the form of an image or portion of an image, thus allowing signal splitting or mixing functions to be performed. In any coupling arrangement, it is important to divide the incoming radiant energy equally into the output fibers. Failure to provide equal distribution results in discernable differences in brightness. If the application is light transmission, such as in the automobile dashboard application, these differences in brightness may be just an annoyance. If, however, the application involves the transmission of an image or a portion of an image, small differences in actual brightness may result in large differences in perceived brightness and perceived degradation of the image.

U.S. Pat. No. 5,408,551 for Optical Coupling Device; issued Apr. 18, 1995 to Egbertus T. C. Maria van Woesik teaches an optical coupling device which attempts to overcome the problem of unequal splitting of the radiant energy by forming a coupler into a u-shape. The arc or curvature of the curved portion of the coupler is chosen such that the incoming light is substantially equally distributed in the receiving fibers. The interface between the end of the single, input fiber and the plural, output fibers is essentially flat. In contradistinction, the interface of the coupler of the present invention is essentially spherical. The spherical interface allows greater ease in uniformly coupling the input energy into the receiving fibers without the need for a U-shaped geometry. This allows the stacking of multiple fiber optic array bundles in close proximity so that, if desired, the outputs of these plural arrays could form a continuous, screen-like surface.

U.S. Pat. No. 5,346,655 for Method of Thermoforming an Optical Fiber End; issued Sep. 13, 1994 to Lee L. Blyler, Jr., et al. discusses a process for thermoforming the end of a clad optical fiber. Blyler, et al. teach forming a gradual transition from a circular cross section to a different cross section, e.g. square or rectangular. The purpose for forming is to allow tighter packing of the ends of a bundle of fibers to receive input from a single optical fiber. Unlike the instant invention, the outer fibers of the Blyler et al. device will still receive a disproportionate amount of the incoming optical energy. The present invention with its spherical interface insures that the optical energy inbound on a single fiber is uniformly distributed to each of the outbound fibers in the bundle. In addition, any optical distortion introduced into the fibers by the forming process will be limited to the single input fiber in the present invention. In the Blyler, et al. system, each outbound fiber may exhibit a different distortion characteristic.

It is therefor and object of the invention to provide a fiber optical coupler of the rectilinear type.

It us another object of the invention to provide an optical coupler wherein there is great uniformity in the amount of radiant energy coupled into each output fiber.

It is a further object of the invention to provide an optical coupler wherein the interface between the output fibers and the input fiber is a concave seat in the output fibers which mates closely with a convex termination on the input fiber.

It is yet another object of the invention to provide an optical coupler suitable for use with images or portions of images.

SUMMARY OF THE INVENTION

The present invention features a fiber optic coupling device wherein a single, input fiber is terminated in an enlarged, convex shape. The ends of a group of typically seven fiber optic strands are ground with a matching concave shape. The optical coupler so constructed allows for great uniformity in the amount of radiant energy transferred from the input fiber into each of the output fibers of the array.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Generally speaking this invention relates to an optical coupler for transmitting energy from a single, emissive, input optical fiber into a plurality of output optical fibers.

Figure 1:
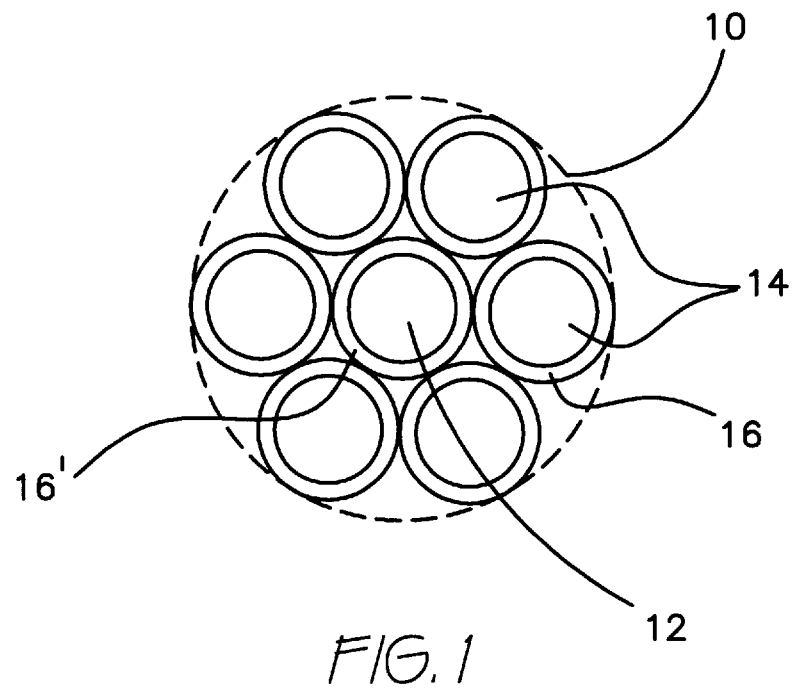
FIG. 1 is an end view of a typical seven-fiber array.

Referring first to FIG. 1, there is shown an end view of an array 10 of seven optical fibers. A central fiber 12, is surrounded by six additional fibers 14 symmetrically arranged. The example chosen for purposes of disclosure assumes that fiber strand 12 and fiber strands 14 are identical. Fibers of approximately 10 mm or smaller diameter have been found suitable for use in forming the coupler of the present invention. At the present time, fibers as small as 0.025 mm in diameter have been found suitable for implementing the coupler of the present invention.

Dissimilar fiber types and/or sizes (not shown) could, however, be utilized to meet a particular operating requirement. Non-circular fibers (not shown) could also be used. Each fiber 12, 14 includes a cladding layer 16 and 16', respectively. Non-clad fibers (not shown) could also be used when circumstances allowed or required. Fiber 12 and fibers 14 are held in a fixed relation by cement. A typical cement found suitable for this purpose is a clear fast cure epoxy manufactured by 3M.

Figure 2:
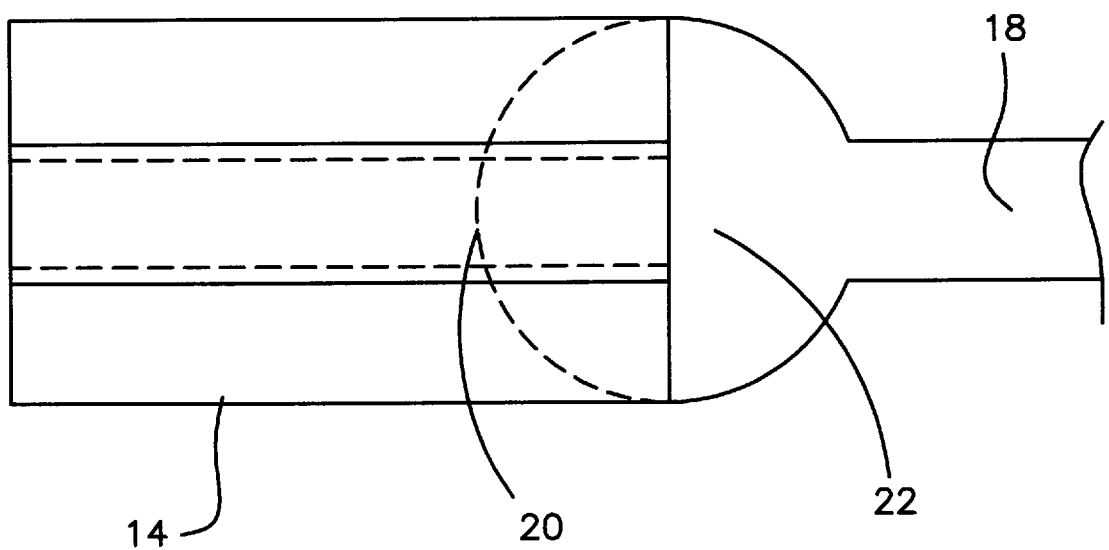
FIG. 2 is a schematic side view of the optical coupler of the invention.

Referring now to FIG. 2, there is shown a side view of the fiber optic array of FIG. 1. The optical fibers 12 (FIG. 1) are arranged in an essentially parallel relationship to one another. A concave depression 20 has been precision ground into the end of fiber optic array 10 (FIG. 1). A robotic grinder using a 5 um acetate coated abrasive grinding ball of appropriate size in relation to the size of fibers being used, then a 1 um acetate coated polishing ball is used to accomplish the grinding. Because the coupler node may be used to carry and image or a portion thereof, a very smooth surface is required. Typically, grinding to a 1 um smoothness is needed. It is also important that the grinding process not damage the fiber strands. During the grinding lubrication is used to prevent damage.

An input fiber 18 is terminated in an enlarged, convex portion 22. Fiber 18 is heated, temperature is determined by application and fiber size to form a ball which is convex portion 22. Input fiber 18 need not be the same diameter, shape, or type of fiber as the optical fibers 14, 14 or array 10 (FIG. 1). Convex portion 18 must, however, exhibit excellent optical properties so that a low-distortion interface results when convex portion 22 is inserted in concave portion 20. Typically, a gap no larger than 10 um can be tolerated. Convex portion 22 is permanently bonded into concave socket 20 using an adhesive such as clear fast cure epoxy manufactured by 3M and sold as catalog number DP105.

The optical transfer efficiency of the interface is typically in the range of 80–99.5%. In addition, the uniformity of the splitting action has been within 7% of one another (i.e., no the percentage of radiant energy transferred to any single fiber in array 10 (FIG. 1) is within 5% of the energy transferred to any other fiber).

The rectilinear geometry of the optical coupler of the invention allows multiple couplers to be arranged side-by-side and/or stacked one upon another for implementing seamless (i.e., with no perceived breaks between the couplers) optical structures.

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent following claims.

What is claimed is:

1. An optical coupler, comprising:
   a first optical fiber having a first end, said first end being convex; and
   an array of optical fibers, each of said optical fibers having a diameter, said array having an end portion wherein said optical fibers are in essentially a parallel relationship to one another, said end portion being adapted to receive said convex end of said first optical fiber whereby radiant energy from said first optical fiber is transferred uniformly to each of said optical fibers of said array.

2. The optical coupler as recited in claim 1, wherein said array of optical fibers comprises a central optical fiber having n additional optical fibers radially, symmetrically and equidistantly disposed therearound.

3. The optical coupler as recited in claim 2, wherein n has a value of six.

4. The optical coupler as recited in claim 1, wherein at least one of said first optical fiber and said array of optical fibers comprises a clad optical fiber.

5. The optical coupler as recited in claim 1, wherein said diameters of said optical fibers is approximately in the range of from 0.025 mm to 10 mm.

6. The optical coupler as recited in claim 1, wherein said convex first end of said first optical fiber is essentially spherical.

7. The optical coupler as recited in claim 1, further comprising:
   cement disposed between said convex structure and said end portion adapted to receive said convex structure, said cement having predetermined optical properties which allow radiant energy to pass unchanged from said convex structure and said optical fibers of said array.

8. The optical coupler as recited in claim 7, wherein said cement is a clear epoxy type cement.

9. The optical coupler as recited in claim 7, wherein said cement is a clear UV cure adhesive.

10. An optical coupler, comprising:
    a first optical fiber having a first end, said first end being a spherical structure, said spherical structure having a diameter d; and
    an array of optical fibers, said array having an end portion wherein said optical fibers are in essentially a parallel relationship to one another, said array also having a diameter of said diameter d of said spherical structure, said end portion being adapted to receive said spherical structure whereby radiant energy from said first optical fiber is transferred uniformly to each of said optical fibers of said array.

* * * * *